United States Patent
Kumar R et al.

(10) Patent No.: US 11,118,632 B2
(45) Date of Patent: Sep. 14, 2021

(54) COULOMB FRICTION AXLE DAMPER

(71) Applicant: GM GLOBAL TECHNOLOGY OPERATIONS LLC, Detroit, MI (US)

(72) Inventors: Rajesh Kumar R, Kerala (IN); Michael J. Grimmer, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 16/443,342

(22) Filed: Jun. 17, 2019

(65) Prior Publication Data

US 2020/0393001 A1  Dec. 17, 2020

(51) Int. Cl.
  *F16D 3/14* (2006.01)
  *F16C 3/02* (2006.01)
  *F16D 1/08* (2006.01)
  *F16F 15/12* (2006.01)
  *F16D 3/12* (2006.01)

(52) U.S. Cl.
  CPC .............. *F16D 3/14* (2013.01); *F16C 3/023* (2013.01); *F16D 1/0841* (2013.01); *F16D 3/12* (2013.01); *F16F 15/1201* (2013.01)

(58) Field of Classification Search
  CPC .... F16C 3/023; F16D 3/12; F16D 3/14; F16F 15/1201; F16F 15/129; F16F 15/322; Y10T 464/50
  USPC ........................................................ 464/180
  See application file for complete search history.

(56) References Cited

U.S. PATENT DOCUMENTS

| | | | | |
|---|---|---|---|---|
| 3,674,355 A | * | 7/1972 | Yearout | F16C 32/067 384/110 |
| 3,917,366 A | * | 11/1975 | Mason | F16C 32/0651 384/110 |
| 4,828,403 A | * | 5/1989 | Schwartzman | F16C 17/10 384/100 |
| 4,884,899 A | * | 12/1989 | Schwartzman | F16C 17/10 384/100 |
| 10,054,167 B2 | | 8/2018 | Piorkowski et al. | |
| 2009/0197690 A1 | * | 8/2009 | Lyscio | F16C 3/02 464/180 |

* cited by examiner

*Primary Examiner* — Josh Skroupa
(74) *Attorney, Agent, or Firm* — Quinn IP Law

(57) ABSTRACT

A coulomb friction damped drive shaft may include an outer shaft defined by a longitudinal axis, a first tapered portion and a second tapered portion at opposite ends of the outer shaft; an inner shaft inserted through the outer shaft along the longitudinal axis and defined by a first uniform portion a second uniform portion adjacent to opposite ends of the inner shaft; a first tapered sleeve inserted between the first uniform portion and the first tapered portion; and a second tapered sleeve inserted between the second uniform portion and the second tapered portion. The first tapered sleeve may be biased along the longitudinal axis toward the second tapered sleeve to create a friction between the inner shaft and the outer shaft. The friction may act on a twisting motion of the inner shaft relative to the outer shaft to coulomb friction dampen oscillations in the inner shaft.

20 Claims, 5 Drawing Sheets

COULOMB FRICTION AXLE DAMPER

INTRODUCTION

A drive shaft is a mechanical component used for transmitting rotation and torque from a powerplant to a receiver. Drive shafts are used to connect components of a drive train that cannot be connected directly because of a distance between or a relative movement between the powerplant and the receiver. In motor vehicles, drive shafts transmit torque from an engine to drive wheels. Engine output torque and vehicle inertia place loads on the drive shafts. The loads result in driveline torsional resonances that cause undesirable vehicle vibrations.

SUMMARY

A coulomb friction axle damped drive shaft is provided. The coulomb friction damped drive shaft generally comprises an outer shaft defined by a longitudinal axis, a first tapered portion at a first outer end and a second tapered portion at a distal second outer end. The coulomb friction axle damped drive shaft may include an inner shaft inserted through the outer shaft along the longitudinal axis and defined by a first uniform portion adjacent to a first inner end and a second uniform portion adjacent to a distal second inner end. The coulomb friction axle damped drive shaft may include a first tapered sleeve inserted between the first uniform portion of the inner shaft and the first tapered portion of the outer shaft. The coulomb friction axle damped drive shaft may further include a second tapered sleeve inserted between the second uniform portion of the inner shaft and the second tapered portion of the outer shaft. The first tapered sleeve may be biased along the longitudinal axis toward the second tapered sleeve to create a friction between the inner shaft and the outer shaft. The friction may act on a twisting motion of the inner shaft relative to the outer shaft to coulomb friction dampen oscillations in the inner shaft.

In one or more embodiments, the coulomb friction damped drive shaft may further comprise a first retainer mounted on the inner shaft between the first tapered sleeve and the first inner end of the inner shaft.

In one or more embodiments, the coulomb friction damped drive shaft may further comprise a first spring installed between the first retainer and the first tapered sleeve. The first spring may be configured to push the first tapered sleeve toward the outer shaft to create the bias.

In one or more embodiments, the first spring may be a wave spring.

In one or more embodiments, the coulomb friction damped drive shaft may further comprise a second retainer mounted on the inner shaft between the second tapered sleeve and the second inner end of the inner shaft.

In one or more embodiments, the coulomb friction damped drive shaft may further comprise a second spring installed between the second retainer and the second tapered sleeve. The second spring may be configured to push the second tapered sleeve toward the outer shaft to add to the bias.

In one or more embodiments, the first spring may comprise a plurality of first springs installed on the inner shaft in between the first retainer and the first tapered sleeve.

In one or more embodiments, each of the first tapered sleeve and the second tapered sleeve may include a plurality of slots oriented parallel to the longitudinal axis while installed on the inner shaft.

In one or more embodiments, the plurality of slots may be arranged such that the first tapered sleeve and the second tapered sleeve conform to an outside diameter of the inner shaft and an inside diameter of the outer shaft while under bias.

A method for manufacturing a coulomb friction damped drive shaft is provided. The method generally comprises providing an outer shaft that may be defined by a longitudinal axis, a first tapered portion at a first outer end and a second tapered portion at a distal second outer end. The method may include inserting an inner shaft through the outer shaft along the longitudinal axis, the inner shaft may be defined by a first uniform portion adjacent to a first inner end and a second uniform portion adjacent to a distal second inner end. The method may include inserting a first tapered sleeve between the first uniform portion of the inner shaft and the first tapered portion of the outer shaft. The method may include inserting a second tapered sleeve between the second uniform portion of the inner shaft and the second tapered portion of the outer shaft. The method may further include installing a bias mechanism to the inner shaft. The mechanism may be configured to bias the first tapered sleeve along the longitudinal axis toward the second tapered sleeve to create a friction between the inner shaft and the outer shaft. The friction may act on a twisting motion of the inner shaft relative to the outer shaft to coulomb friction dampen oscillations in the inner shaft.

In one or more embodiments, the installing of the bias mechanism may comprise: installing a first spring adjoining the first tapered sleeve; and installing a first retainer attached to the inner shaft. The first spring may be configured to bias the first tapered sleeve into the outer shaft.

A drive train for a motor vehicle is provided. The drive train generally comprises: a powerplant configured to generate a torque; a drive wheel; and a coulomb friction damped drive shaft configured to transmit the torque from the powerplant to the drive wheel. The coulomb friction damped drive shaft may include: an outer shaft defined by a longitudinal axis, a first tapered portion at a first outer end and a second tapered portion at a distal second outer end. The coulomb friction damped drive shaft may include an inner shaft inserted through the outer shaft along the longitudinal axis and defined by a first uniform portion adjacent to a first inner end and a second uniform portion adjacent to a distal second inner end. The coulomb friction damped drive shaft may further include a first tapered sleeve inserted between the first uniform portion of the inner shaft and the first tapered portion of the outer shaft, and a second tapered sleeve inserted between the second uniform portion of the inner shaft and the second tapered portion of the outer shaft. The first tapered sleeve may be biased along the longitudinal axis toward the second tapered sleeve to create a friction between the inner shaft and the outer shaft. The drive shaft may be configured such that the friction acts on a twisting motion of the inner shaft relative to the outer shaft to coulomb friction dampen oscillations in the inner shaft.

In one or more embodiments, the friction damped drive shaft may further include a first retainer mounted on the inner shaft between the first tapered sleeve and the first inner end of the inner shaft.

In one or more embodiments, the friction damped drive shaft may further include a first spring installed between the first retainer and the first tapered sleeve. The first spring may be configured to push the first tapered sleeve toward the outer shaft to create the bias.

In one or more embodiments, the first spring may be a wave spring.

In one or more embodiments, the friction damped drive shaft may further include a second retainer mounted on the inner shaft between the second tapered sleeve and the second inner end of the inner shaft.

In one or more embodiments, the friction damped drive shaft may further include a second spring installed between the second retainer and the second tapered sleeve. The second spring may be configured to push the second tapered sleeve toward the outer shaft to add to the bias.

In one or more embodiments, the first spring may comprise a plurality of first springs installed on the inner shaft in between the first retainer and the first tapered sleeve In one or more embodiments, each of the first tapered sleeve and the second tapered sleeve may include a plurality of slots oriented parallel to the longitudinal axis while installed on the inner shaft.

In one or more embodiments, the plurality of slots may be arranged such that the first tapered sleeve and the second tapered sleeve conform to an outside diameter of the inner shaft and an inside diameter of the outer shaft while under bias.

The above features and advantages and other features and advantages of the present disclosure are readily apparent from the following detailed description of the best modes for carrying out the disclosure when taken in connection with the accompanying drawings.

DETAILED DESCRIPTION

Embodiments of the present design generally add mechanical damping components to a most-influential component in a torsional drive system to reduce or minimize vibrations. In various embodiments, one or more mechanical damping components may be applied to one or more shafts between an engine and one or more drive wheels. The mechanical damping components generally offer coulomb friction damping on each shaft to mitigate transient torque triggered driveline oscillations. Each shaft may be implemented as a drive shaft, an axle shaft, a propeller shaft, a Cardan shaft or other physically-long torque-transferring shaft.

Figure 1:
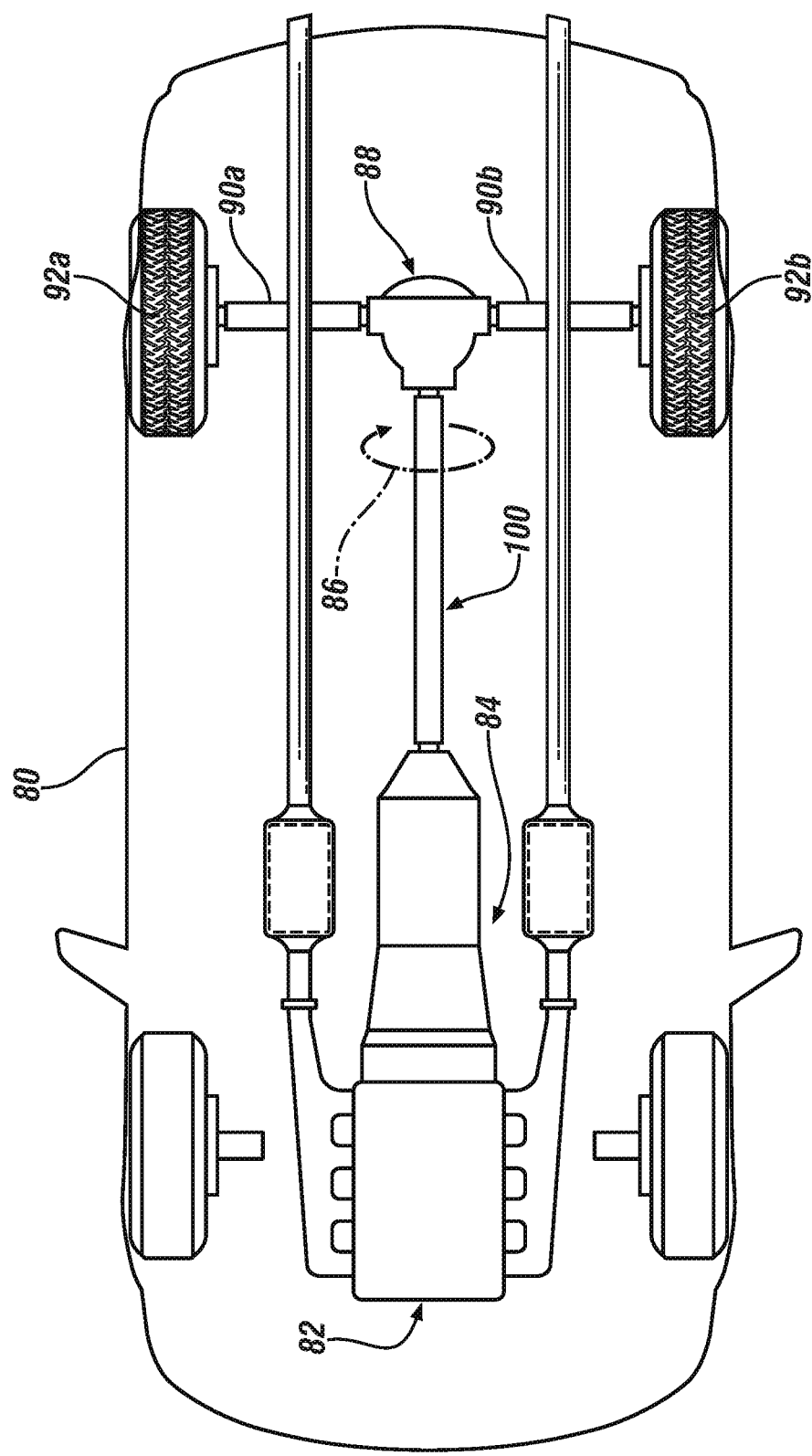
FIG. 1 a schematic diagram illustrating a context of a platform that utilizes a coulomb friction damper in a drive shaft.

Referring to FIG. 1, a schematic diagram illustrating a context of a platform that utilizes a coulomb friction damper in a drive shaft is shown. In various embodiments, the platform may be implemented as motor vehicle 80. The motor vehicle 80 may include mobile vehicles such as automobiles, trucks, motorcycles, boats, trains and/or aircraft. In some embodiments, the platform may be a stationary object. The stationary objects may include, but are not limited to, powerplants, industrial machines and/or amusement rides. Other types of platforms may be implemented to meet the design criteria of a particular application.

The motor vehicle 80 generally includes a drive-train adapted for propelling the vehicle. The drive-train generally comprises a powerplant (e.g., an internal combustion engine) 82, a transmission 84, a drive shaft 100 for transmitting engine torque 86 from the transmission 84 to a differential 88, one or more axle shafts (e.g., a first axle shaft 90a and a second axle shaft 90b) connected to one or more driven wheels (e.g., a first drive wheel 92a and a second drive wheel 92b). Although the following disclosure primarily describes the drive shaft 100 as a shaft extending longitudinally between the transmission 84 and the differential 88, the drive shaft 100 may also be employed as the first axle shaft 90a and/or the second axle shaft 90b that extend between the differential 88 and the driven wheels 92a-92b.

Figure 2:
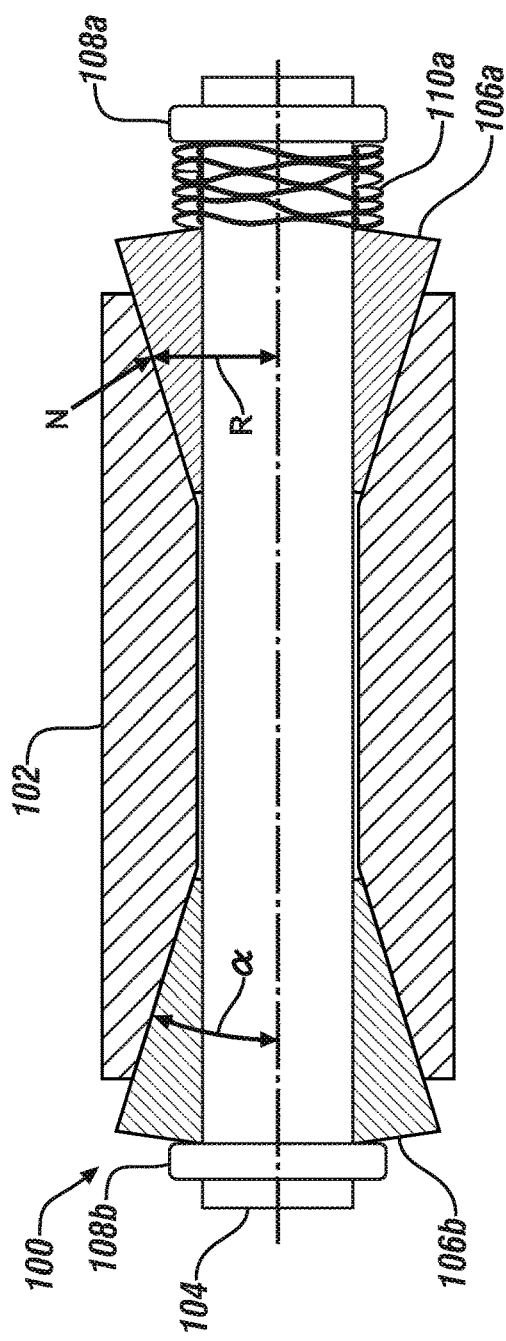
FIG. 2 is a schematic cross-sectional diagram of a drive shaft in accordance with an exemplary embodiment.

Referring to FIG. 2, a schematic cross-sectional diagram of an example implementation of the drive shaft 100 is shown in accordance with an exemplary embodiment. The drive shaft 100 generally comprises an outer shaft 102, an inner shaft 104, a first tapered sleeve 106a, a second tapered sleeve 106b, a first retainer 108a, a second retainer 108b and a first spring 110a.

The outer shaft 102 may implement a hollow shaft. The outer shaft 102 may be fabricated of a hard metal. A thickness of a wall of the outer shaft 102 may be tapered proximate each end of the outer shaft 102. In various embodiments, an angle (e.g., a) of the taper may range from approximately 10 degrees to approximately 90 degrees.

The inner shaft 104 may implement a main shaft. In various embodiments, the inner shaft 104 may be a solid shaft. In other embodiments, the inner shaft 104 may be a hollow shaft to reduce weight. The inner shaft 104 may be fabricated of a hard metal. The inner shaft 104 may be disposed inside the outer shaft 102 along a common axis of rotation (e.g., the axis of rotation 130).

Each tapered sleeve 106a-106b may implement a conical-shaped sleeve. The first tapered sleeve 106a may be disposed between the inner shaft 104 and the outer shaft 102 at one end of the outer shaft 102. The second tapered sleeve 106b may be disposed between the inner shaft 104 and the outer shaft 102 at an opposite distal end of the outer shaft 102. The first tapered sleeve 106a and the second tapered sleeve 106b may be coaxially aligned with the axis of rotation 130 of the inner shaft 104 and the outer shaft 102.

Each retainer 108a-108b may implement a snap ring attached to the inner shaft 104. The first retainer 108a may be position on the inner shaft 104 separated from the first tapered sleeve 106a. The second retainer 108b may be positioned on the inner shaft 104 adjoining the second tapered sleeve 106b.

The first spring 110a may implement a compression spring that provides a bias mechanism to the tapered sleeves 106a-106b. The first spring 110a may be disposed around the inner shaft 104 between the first tapered sleeve 106a and the first retainer 108a. The first spring 110a may be operational to push the first tapered sleeve 106a toward the outer shaft 102. A force of the first spring 110a against the first tapered sleeve 106a may compress the second tapered sleeve 106b between the outer shaft 102 and the second retainer 108b. In various embodiments, the first spring 110a may be implemented as a high stiffness spring. The first spring 110a may be an axle spring, a tapered spring, a helix spring, wave spring, a spring washer and/or a Belville washer. Other types of springs may be implemented to meet the design criteria of a particular application.

The inner shaft 104 generally flexes under load but the outer shaft 102 does not flex as much, as the outer shaft 102 may not take part in the load transfer. The tapered sleeves 106a-106b may offer a frictional torque (coulomb friction damping) as the inner shaft 104 flexes relative to the outer shaft 102.

A compression force of the first spring 110a pushing the tapered sleeves 106a-106b against the outer shaft 102 may create a normal force (N) where an outer surface of the tapered sleeves 106a-106b engages an inner surface of the outer shaft 102. A friction force (F) caused by the normal force N may be given by formula 1 as follows:

$$F = \mu \times N \quad (1)$$

Where $\mu$ may be a dynamic coefficient of friction.

A frictional torque (T) created by the frictional force F may be given by formula 2 as follows:

$$T = F \times R \quad (2)$$

Wherein R may be an average radius from the axis of rotation 130 to the interface between the tapered sleeves 106a-106b and the outer shaft 102.

The frictional torque T generally provides mechanical damping where the oscillations of the inner shaft 104 relative to the outer shaft 102 may be absorbed by the tapered sleeves 106a-106b sliding against the outer shaft 102, and to a degree, the tapered sleeves 106a-106b sliding against the inner shaft 104. The resulting coulomb friction damping may be a dissipation of the energy from the oscillations where kinetic energy is configured to heat.

Figure 3:
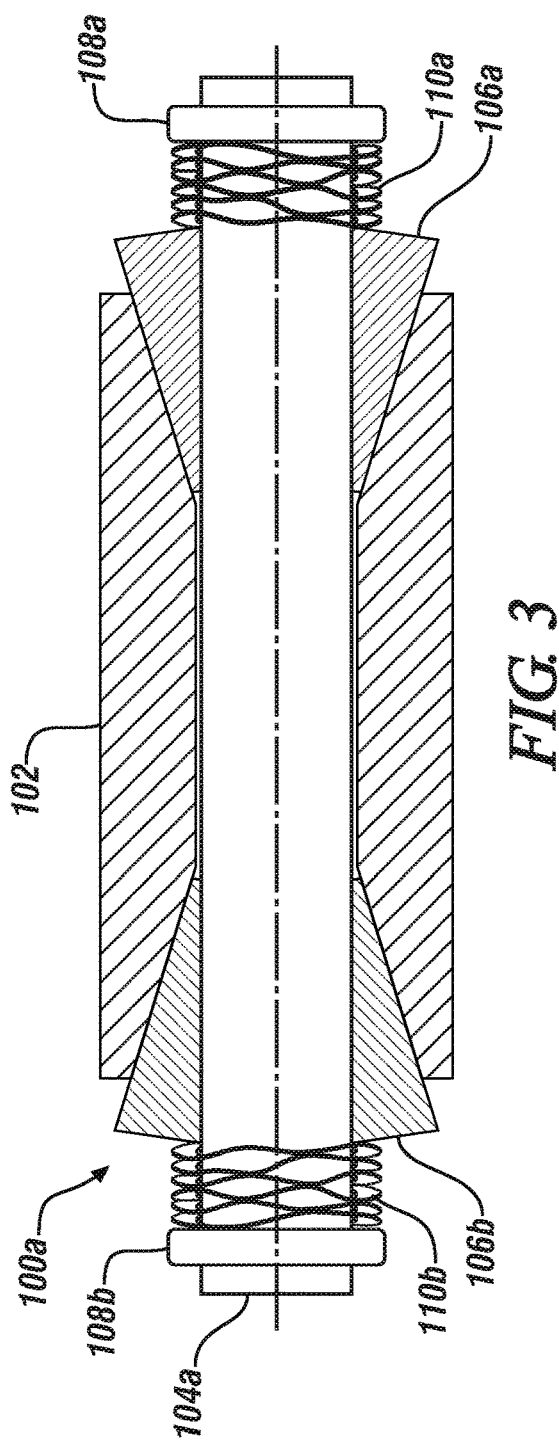
FIG. 3 is a schematic cross-sectional diagram of another drive shaft in accordance with an exemplary embodiment.

Referring to FIG. 3, a schematic cross-sectional diagram of another example implementation of a drive shaft 100a is shown in accordance with an exemplary embodiment. The drive shaft 100a may be a variation of the drive shaft 100. The drive shaft 100a generally comprises the outer shaft 102, an inner shaft 104a, the first tapered sleeve 106a, the second tapered sleeve 106b, the first retainer 108a, the second retainer 108b, the first spring 110a and a second spring 110b.

The inner shaft 104a may be a variation of the inner shaft 104. The inner shaft 104a may be configured such that the second retainer 108b is spaced apart from the second tapered sleeve 106b. The spacing may be sufficient to accommodate the second spring 110b between the second retainer 108b and the second tapered sleeve 106b.

The second spring 110b may be a copy of the first spring 110a. The second spring 110b is generally operational to push the second tapered sleeve 106b toward the outer shaft 102 and so forms part of the bias mechanism. Thus, the first spring 110a and the second spring 110b may bias the first tapered sleeve 106a and the second tapered sleeve 106b toward each other and toward the outer shaft 102.

In various embodiments, more than two springs may be implemented. In some embodiments, two or more springs may be implemented adjoining the first tapered sleeve 106a alone, the second tapered sleeve 106b alone, or a combination of the first tapered sleeve 106a and the second tapered sleeve 106b. Multiple springs may help fight adverse environmental-induced actions, such as corrosion.

Figure 4:
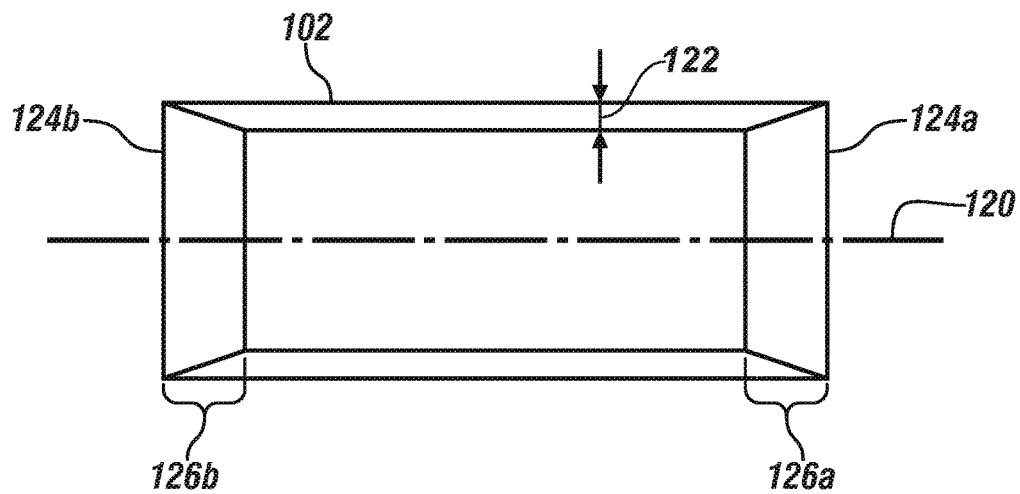
FIG. 4 is a schematic cross-sectional diagram of an outer shaft in accordance with an exemplary embodiment.

Referring to FIG. 4, a schematic cross-sectional diagram of the outer shaft 102 is shown in accordance with an exemplary embodiment. The outer shaft 102 may have a longitudinal axis 120. A wall of the outer shaft 102 may have a wall thickness 122. The outer shaft 102 may have a first outer end 124a and a second outer end 124b. The wall thickness 122 may be tapered in a first tapered portion 126a to form a conical surface at the outer shaft 102 at the first outer end 124a. The wall thickness 122 may also be tapered in a second tapered portion 126b to form another conical surface of the outer shaft 102 at the second outer end 124b.

Figure 5:
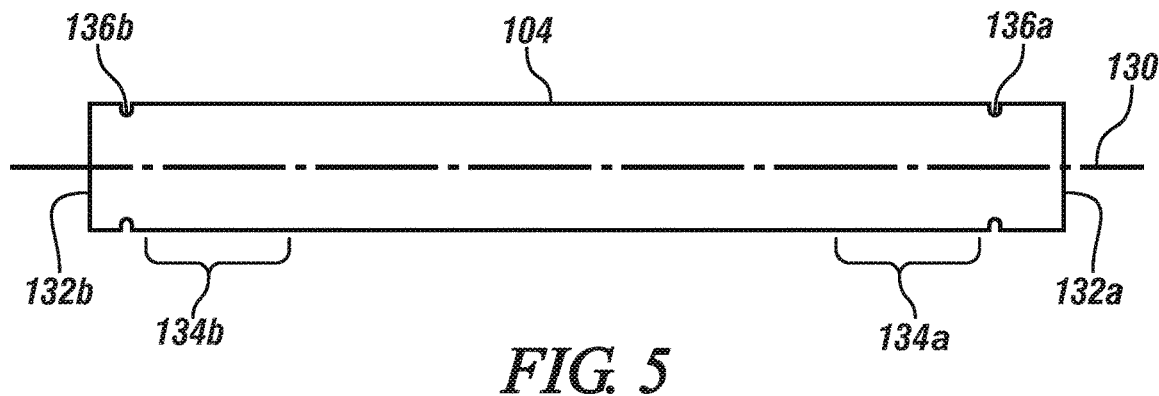
FIG. 5 is a schematic sideview diagram of an inner shaft in accordance with an exemplary embodiment.

Referring to FIG. 5, a schematic side view diagram of the inner shaft 104 is shown in accordance with an exemplary embodiment. The inner shaft 104 generally has an axis of rotation 130, a first inner end 132a and a distal a second inner end 132b. A first uniform portion 134a of the inner shaft 104 may be defined near the first inner end 132a. The first uniform portion 134a may define a region where the inner shaft 104 engages the first tapered sleeve 106a. A second uniform portion 134b of the inner shaft 104 may be defined near the second inner end 132b. The second uniform portion 134b may define a region where the inner shaft 104 engages the second tapered sleeve 106b.

The inner shaft 104 may also include a first groove 136a proximate to the first uniform portion 134a and a second groove 136b proximate to the second uniform portion 134b. The first groove 136a may be configured to accept the first retainer 108a. The second groove 136b may be configured to accept the second retainer 108b.

Figure 6:
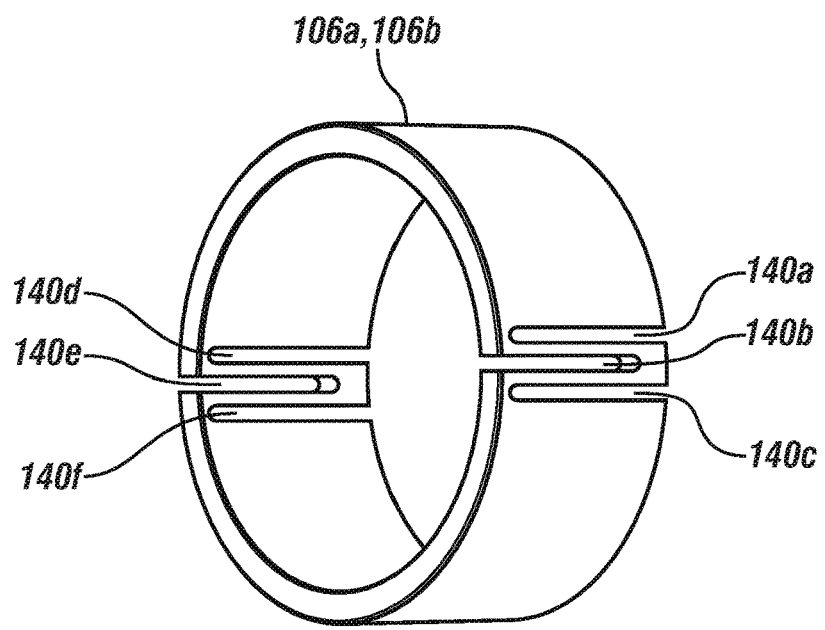
FIG. 6 is a schematic perspective diagram of a tapered sleeve in accordance with an exemplary embodiment.

Referring to FIG. 6, a schematic perspective diagram of the first tapered sleeve 106a and the second tapered sleeve 106b is shown in accordance with an exemplary embodiment. The first tapered sleeve 106a and the second tapered sleeve 106b may each be implemented as a cone-shaped sleeve. The first tapered sleeve 106a and the second tapered sleeve 106b may be implemented in a metal galvanically compatible with the outer shaft 102 and the inner shaft 104.

In some embodiments, a series of slots 140a-140f may be formed in each of the first tapered sleeve 106a and the second tapered sleeve 106b. The slots 140a-140f may be arranged in parallel with the axis of rotation 130 while the tapered sleeves 106a-106b are installed on the inner shaft 104. In various embodiments, the slots 140a-140f may be formed in two or more sets distributed around a circumference of the tapered sleeves 106a-106b. Within each set (e.g., 140a-140c and 140d-140f), every other slot 140a-140f may extend into the tapered sleeves 106a-106b from opposite sides. The slots 140a-140c and the slots 140d-140f may enable the tapered sleeves 106a-106b to flex and conform to the inside diameter of the outer shaft 102 and the outside diameter of the inner shaft 104.

In other embodiments, the tapered sleeves 106a-106b may be formed without the slots 140a-140f. Manufacturing the tapered sleeves 106a-106b without the slots 140a-140f may be easier and/or less expensive than with the slots 140a-140f.

In various embodiments, each tapered sleeve 106a-106b may be created as one or more individual pieces. For example, each tapered sleeve 106a-106b may be fabricated as a single part, as shown in the figures. In other embodiments, each tapered sleeve 106a-106b may be fabricated as two or more parts. In a two-piece embodiment, each half of each tapered sleeve 106a-106b may have a circumference of slightly less than half of a circle. When placed next to each other, the two halves may have slight gaps between each other that allow the halves to conform to the outer shaft 102 and the inner shaft 104. In other embodiments, each tapered sleeve 106*a*-106*b* may be fabricated in more than two pieces (e.g., three pieces, four pieces, five pieces, etc.).

Figure 7:
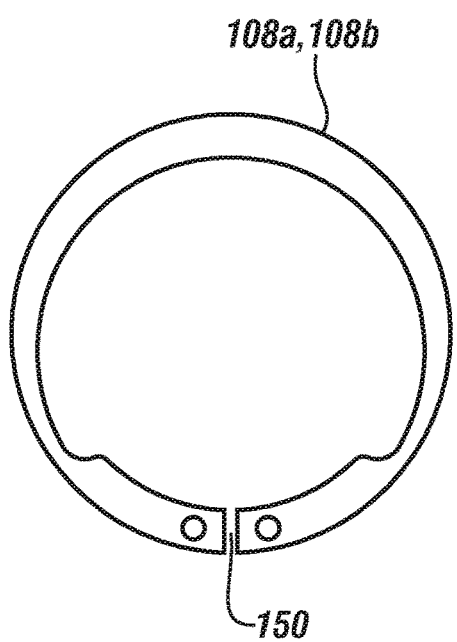
FIG. 7 is a schematic plan view diagram of a retainer in accordance with an exemplary embodiment.

Referring to FIG. 7, a schematic plan view diagram of the first retainer 108*a* and the second retainer 108*b* is shown in accordance with an exemplary embodiment. Each retainer 108*a*-108*b* may implement a snap ring. Each retainer 108*a*-108*b* may include a retainer gap 150. The retainer gap 150 may be sized to allow the retainers 108*a*-108*b* to be attached to the inner shaft 104 at the grooves 136*a*-136*b*.

Figure 8:
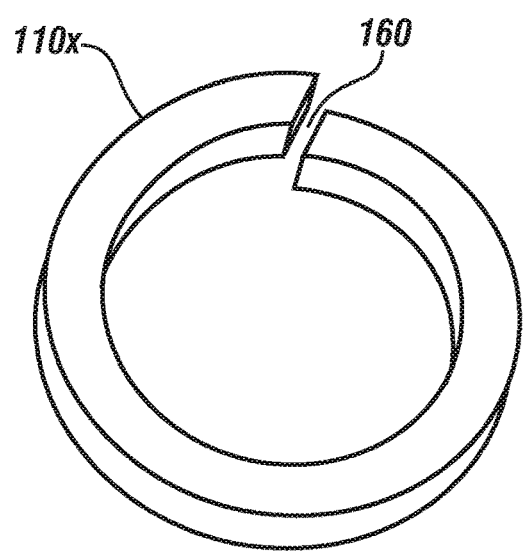
FIG. 8 is a schematic perspective diagram of a spring washer in accordance with an exemplary embodiment.

Referring to FIG. 8, a schematic perspective diagram of a spring washer 110*x* is shown in accordance with an exemplary embodiment. The spring washer 110*x* may be representative of the first spring 110*a* and/or the second spring 110*b*. The spring washer 110*x* generally includes a washer gap 160. The spring washer 110*x* generally implements a single-turn washer. The washer gap 160 may enable the spring washer 110*x* to be compressed.

Figure 9:
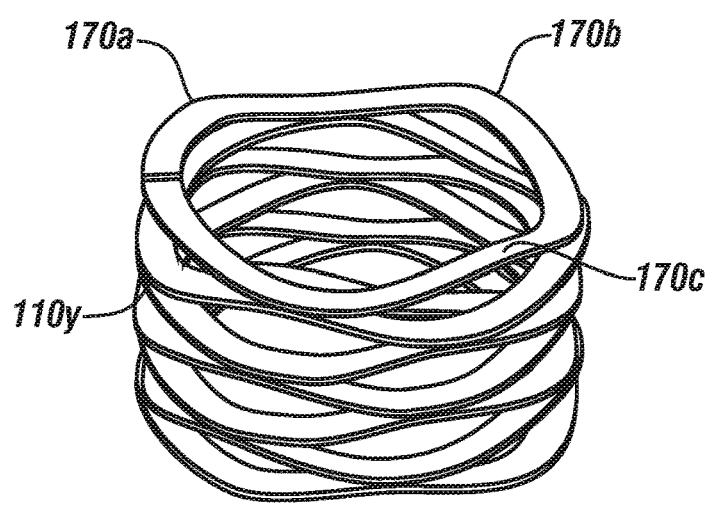
FIG. 9 is a schematic perspective diagram of a wave spring in accordance with an exemplary embodiment.

Referring to FIG. 9, a schematic perspective diagram of a wave spring 110*y* is shown in accordance with an exemplary embodiment. The wave spring 110*y* may be representative of the first spring 110*a* and/or the second spring 110*b*. The wave spring 110*y* generally comprises one or more layers of springs stacked on each other. Each outer-end spring may include multiple (e.g., three) high points 170*a*-170*c* that allow the wave spring 110*y* to contact the tapered sleeves 106*a*-106*b* and the retainers 108*a*-108*b* at multiple locations.

Figure 10:
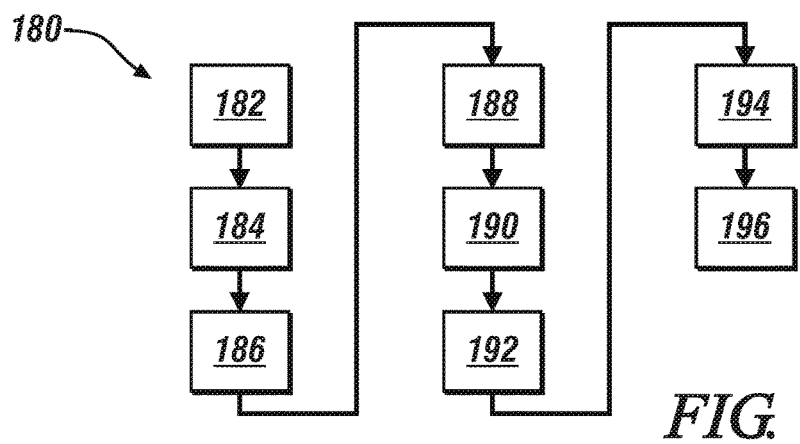
FIG. 10 is a flow diagram of a method for fabricating a drive shaft in accordance with an exemplary embodiment.

Referring to FIG. 10, a flow diagram of a method 180 for fabricating the drive shafts 100-100*a* is shown in accordance with an exemplary embodiment. The method (or process) 180 may be implemented with common fabrication techniques. The method 180 generally comprises a step (or state) 182, a step (or state) 184, a step (or state) 186 a step (or state) 188, a step (or state) 190, a step (or state) 192, a step (or state) 194 and a step (or state) 196. The sequence of steps 182 to 196 is shown as a representative example. Other step orders may be implemented to meet the criteria of a particular application.

In step 182, the outer shaft 102 may be provided as a starting point for the method 180. The inner shaft 104 may be inserted into the outer shaft 102 along the longitudinal axis 120 of the outer shaft 102 in step 182. In step 184, one of the tapered sleeves (e.g., the first tapered sleeve 106*a*) may be inserted around the inner shaft 104 and slide into contact with the outer shaft 102. The other tapered sleeve (e.g., the second tapered sleeve 106*b*) may be inserted around the inner shaft 104 in step 186 and slide into contact with the outer shaft 102.

One or more of the springs (e.g., the first spring 110*a*) may be inserted around the inner shaft 104 (e.g., at the first inner end 132*a*) and slide into contact with the corresponding tapered sleeve (e.g., the first tapered sleeve 106*a*) in step 190. In embodiments having springs on both sides of the drive shaft (e.g., 100*a*), one or more of the other springs (e.g., the second spring 110*b*) may be inserted around the inner shaft 104 (e.g., at the second inner end 132*b*) and slide into contact with the corresponding tapered sleeve (e.g., the second tapered sleeve 106*b*) in step 192.

In step 194, the first retainer 108*a* may be inserted around the inner shaft 104 at the first inner end 132*a*, the first spring 110*a* may be compressed, and the first retainer 108*a* may be attached to the inner shaft 104 at the first groove 136*a*. In step 196, the second retainer 108*b* may be inserted around the inner shaft 104 at the second inner end 132*b*, the second spring 110*b* (if present) may be compressed, and the second retainer 108*b* may be attached to the inner shaft 104 at the second groove 136*b*. The steps 190 to 196 may be considered the installation of a bias mechanism to force the tapered sleeves 106*a*-106*b* toward each other and the outer shaft 102.

Figure 11:
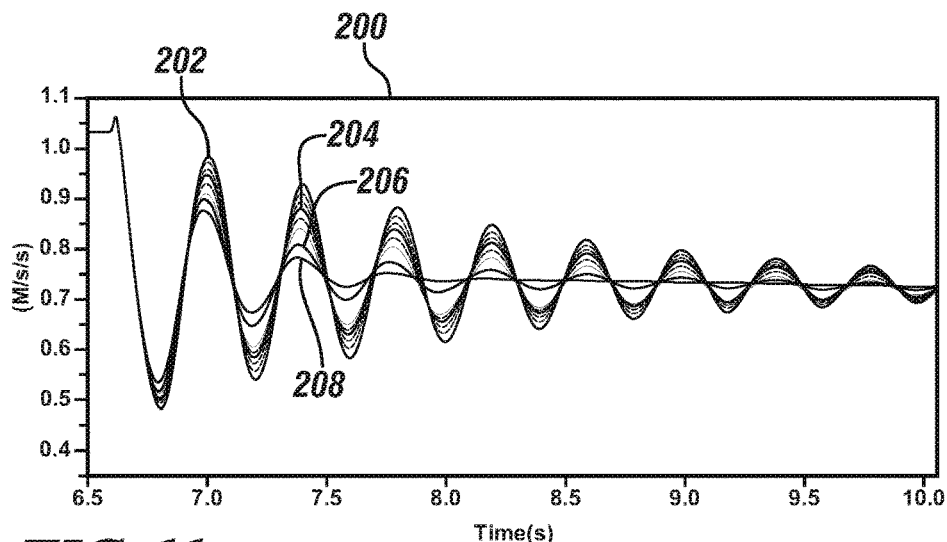
FIG. 11 is a graph of axle damping effects on chassis oscillation in accordance with an exemplary embodiment.

Referring to FIG. 11, a graph 200 of axle damping effects on chassis oscillation is shown in accordance with an exemplary embodiment. The graph 200 may show a trace 202, a trace 204, a trace 206 and a trace 208 based on various levels of axle damping. A y axis of the graph 200 may be an acceleration in units of meters/second/second (m/s/s). An x axis of the graph 200 may be time in units of seconds(s). The engine torque 86 initially applied to a constant load through the drive shaft 100 at a launch time may be several tens (e.g., 75) of Newton-meters (Nm). The launch time may be at approximately 6.7 seconds in the graph 200.

The trace 202 generally shows an oscillation while no axle damping is applied (e.g., zero Nm). A starting amplitude of acceleration may be 0.5856 m/s/s with an oscillation half-life of 1.056 seconds. The trace 208 generally shows an oscillation while a modest amount (e.g., 20 Nm) axle damping is applied. A starting amplitude of acceleration may be 0.5494 m/s/s with the oscillation half-life of 0.29 seconds. The traces 204 and 206 generally illustrate the effects at intermediate levels of axle damping (e.g., 6 Nm and 15 Nm).

A set of several (e.g., 9) runs at various levels of axle damping between 0 Nm and 20 Nm was performed. Results of the runs may be shown in Table 1 as follows:

TABLE 1

| Axle Damping (Nm) | Start Amplitude (chassis acceleration m/s/s) | Half Lift (seconds) |
| --- | --- | --- |
| 0 | 0.5856 | 1.056 |
| 2 | 0.5808 | 0.844 |
| 4 | 0.5764 | 0.702 |
| 6 | 0.5727 | 0.604 |
| 8 | 0.5694 | 0.532 |
| 10 | 0.5661 | 0.466 |
| 15 | 0.5576 | 0.36 |
| 20 | 0.5494 | 0.29 |

Figure 12:
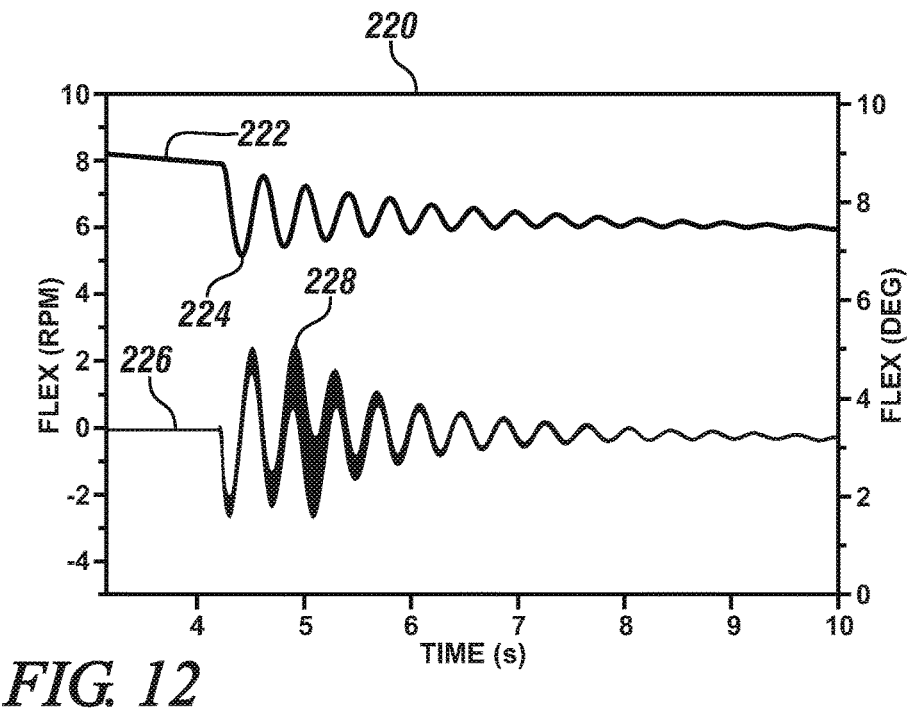
FIG. 12 is a graph of axle twisting in accordance with an exemplary embodiment.

Referring to FIG. 12, a graph 220 of example axle twisting is shown in accordance with an exemplary embodiment. The graph 220 may show a trace 222 and a trace 226. A left y axis of the graph 220 generally illustrates a change in flex of the inner shaft 104 in units of revolutions per minute. A right y axis of the graph 220 may illustrate the flex of the drive shaft 100 in units of degrees. An x axis of the graph 220 generally illustrates time in units of seconds. Engine torque applied to a constant load through the drive shaft 100 may be altered at approximately 4.1 seconds.

The trace 222 initially shows a flex of the drive shaft 100 of approximately 8.8 degrees under steady state conditions prior to the change in torque. At the change in the applied torque at approximately 4.1 seconds, the drive shaft 100 may flex to approximately 6.8 degrees and subsequently oscillate for several seconds thereafter. The flexing may undergo an initial (e.g., approximately 2) degree peak-to-peak swing 224 and a decline in amplitude afterwards. The amplitude of the twisting motion may be sufficient to enable coulomb friction damping of the drive shaft 100.

The trace 226 generally shows no deviation in initial rotational speed of the drive shaft 100 at a contestant driving speed. In response to a change in the applied torque at approximately 4.1 seconds, the drive shaft 100 may change rotational speed by approximately −2.2 revolutions per minute and subsequently oscillate in speed for several seconds. A peak change 228 in the rotational speed may occur shortly after the change in applied torque and decline thereafter.

Embodiments of the design generally aid in driveline torsional damping using coulomb friction damping on the axle shaft. Coulomb friction damping may be achieved by forcing the two expandable tapered sleeves 106a-106b against the two uniform portions 134a-134b of the surface of the inner shaft 104 using the outer shaft 102. The outer shaft 102 may have two tapered portions 126a-126b machined therein to clamp the tapered sleeves 106a-106b. A bias provided by one or more springs 110a-110b may be applied on the tapered sleeves 106a-106b to achieve an intended frictional torque.

The frictional torque may provide damping against driveline oscillations that get triggered under a transient torque application. The damping may improve drive quality and reduce lost fuel economy that otherwise may occur from torque management with transmission clutch slipping. The damping of driveline oscillations may reduce a burden on other torque management mechanisms and/or devices for the remediation of driveline vibration.

The implementation of the drive shafts 100/100a may benefit from simplicity in design. The simplicity may allow for ease of assembly. The drive shafts 100/100a may be implemented within typical axle designs using minimal additional packaging space for the components.

While the best modes for carrying out the disclosure have been described in detail, those familiar with the art to which this disclosure relates will recognize various alternative designs and embodiments for practicing the disclosure within the scope of the appended claims.

What is claimed is:

1. A coulomb friction damped drive shaft comprising:
   an outer shaft defined by a longitudinal axis, a first tapered portion at a first outer end and a second tapered portion at a distal second outer end;
   an inner shaft inserted through the outer shaft along the longitudinal axis and defined by a first uniform portion adjacent to a first inner end and a second uniform portion adjacent to a distal second inner end;
   a first tapered sleeve inserted between the first uniform portion of the inner shaft and the first tapered portion of the outer shaft; and
   a second tapered sleeve inserted between the second uniform portion of the inner shaft and the second tapered portion of the outer shaft, wherein:
   the first tapered sleeve is biased along the longitudinal axis toward the second tapered sleeve to create a friction between the inner shaft and the outer shaft; and
   the friction acts on a twisting motion of the inner shaft relative to the outer shaft to coulomb friction dampen oscillations in the inner shaft.

2. The coulomb friction damped drive shaft according to claim 1, further comprising a first retainer mounted on the inner shaft between the first tapered sleeve and the first inner end of the inner shaft.

3. The coulomb friction damped drive shaft according to claim 2, further comprising a first spring installed between the first retainer and the first tapered sleeve, the first spring being configured to push the first tapered sleeve toward the outer shaft to create the bias.

4. The coulomb friction damped drive shaft according to claim 3, wherein the first spring is a wave spring.

5. The coulomb friction damped drive shaft according to claim 3, further comprising a second retainer mounted on the inner shaft between the second tapered sleeve and the second inner end of the inner shaft.

6. The coulomb friction damped drive shaft according to claim 5, further comprising a second spring installed between the second retainer and the second tapered sleeve, the second spring being configured to push the second tapered sleeve toward the outer shaft to add to the bias.

7. The coulomb friction damped drive shaft according to claim 3, wherein the first spring comprises a plurality of first springs installed on the inner shaft in between the first retainer and the first tapered sleeve.

8. The coulomb friction damped drive shaft according to claim 1, wherein each of the first tapered sleeve and the second tapered sleeve includes a plurality of slots oriented parallel to the longitudinal axis while installed on the inner shaft.

9. The coulomb friction damped drive shaft according to claim 8, wherein the plurality of slots are arranged such that the first tapered sleeve and the second tapered sleeve conform to an outside diameter of the inner shaft and an inside diameter of the outer shaft while under bias.

10. A method for manufacturing a coulomb friction damped drive shaft, comprising:
    providing an outer shaft defined by a longitudinal axis, a first tapered portion at a first outer end and a second tapered portion at a distal second outer end;
    inserting an inner shaft through the outer shaft along the longitudinal axis, the inner shaft defined by a first uniform portion adjacent to a first inner end and a second uniform portion adjacent to a distal second inner end;
    inserting a first tapered sleeve between the first uniform portion of the inner shaft and the first tapered portion of the outer shaft;
    inserting a second tapered sleeve between the second uniform portion of the inner shaft and the second tapered portion of the outer shaft; and
    installing a bias mechanism to the inner shaft, the mechanism being configured to bias the first tapered sleeve along the longitudinal axis toward the second tapered sleeve to create a friction between the inner shaft and the outer shaft, wherein the friction acts on a twisting motion of the inner shaft relative to the outer shaft to coulomb friction dampen oscillations in the inner shaft.

11. The method according to claim 10, wherein the installing of the bias mechanism comprises:
    installing a first spring adjoining the first tapered sleeve; and
    installing a first retainer attached to the inner shaft, wherein the first spring is configured to bias the first tapered sleeve into the outer shaft.

12. A drive train for a motor vehicle comprising:
    a powerplant configured to generate a torque;
    a drive wheel; and
    a coulomb friction damped drive shaft configured to transmit the torque from the powerplant to the drive wheel, the coulomb friction damped drive shaft includes:
    an outer shaft defined by a longitudinal axis, a first tapered portion at a first outer end and a second tapered portion at a distal second outer end;
    an inner shaft inserted through the outer shaft along the longitudinal axis and defined by a first uniform portion adjacent to a first inner end and a second uniform portion adjacent to a distal second inner end;

a first tapered sleeve inserted between the first uniform portion of the inner shaft and the first tapered portion of the outer shaft; and a second tapered sleeve inserted between the second uniform portion of the inner shaft and the second tapered portion of the outer shaft, wherein:

the first tapered sleeve is biased along the longitudinal axis toward the second tapered sleeve to create a friction between the inner shaft and the outer shaft; and the drive shaft is configured such that the friction acts on a twisting motion of the inner shaft relative to the outer shaft to coulomb friction dampen oscillations in the inner shaft.

13. The drive train according to claim 12, wherein the friction damped drive shaft further includes a first retainer mounted on the inner shaft between the first tapered sleeve and the first inner end of the inner shaft.

14. The drive train according to claim 13, wherein the friction damped drive shaft further includes a first spring installed between the first retainer and the first tapered sleeve, the first spring being configured to push the first tapered sleeve toward the outer shaft to create the bias.

15. The drive train according to claim 14, wherein the first spring is a wave spring.

16. The drive train according to claim 14, wherein the friction damped drive shaft further includes a second retainer mounted on the inner shaft between the second tapered sleeve and the second inner end of the inner shaft.

17. The drive train according to claim 16, wherein the friction damped drive shaft further includes a second spring installed between the second retainer and the second tapered sleeve, the second spring being configured to push the second tapered sleeve toward the outer shaft to add to the bias.

18. The drive train according to claim 14, wherein the first spring comprises a plurality of first springs installed on the inner shaft in between the first retainer and the first tapered sleeve.

19. The drive train according to claim 12, wherein each of the first tapered sleeve and the second tapered sleeve includes a plurality of slots oriented parallel to the longitudinal axis while installed on the inner shaft.

20. The drive train according to claim 19, wherein the plurality of slots are arranged such that the first tapered sleeve and the second tapered sleeve conform to an outside diameter of the inner shaft and an inside diameter of the outer shaft while under bias.

* * * * *